United States Patent
Buschy

(10) Patent No.: US 6,681,721 B1
(45) Date of Patent: Jan. 27, 2004

(54) SIMULATED BIRD HUNTING DOG-TRAINING DEVICE FOR TEACHING A DOG TO RETRIEVE

(76) Inventor: Christopher L. Buschy, 976 Sablewood Dr., Loveland, CO (US) 80538

( * ) Notice: Subject to any disclaimer, the term of this patent is extended or adjusted under 35 U.S.C. 154(b) by 0 days.

(21) Appl. No.: 10/385,827

(22) Filed: Mar. 10, 2003

(51) Int. Cl.[7] ............................................. A01K 29/00
(52) U.S. Cl. ...................................... 119/709; 119/707
(58) Field of Search ................................ 119/707, 709, 119/711, 905; D30/160; D22/132; 43/2, 3

(56) References Cited

U.S. PATENT DOCUMENTS

| | | | |
|---|---|---|---|
| 745,806 A | * 12/1903 | Erb, Jr. ........................ | 119/707 |
| 4,074,657 A | * 2/1978 | Senior et al. ................ | 119/709 |
| 4,223,636 A | * 9/1980 | Dishong ...................... | 119/709 |
| 4,770,123 A | * 9/1988 | Bell ............................. | 119/709 |
| 4,907,537 A | * 3/1990 | Shirk .......................... | 119/709 |
| 5,560,320 A | * 10/1996 | Plunk .......................... | 119/709 |
| 5,706,762 A | * 1/1998 | Dokken ....................... | 119/707 |
| 5,865,146 A | * 2/1999 | Markham ..................... | 119/707 |
| 5,904,118 A | * 5/1999 | Markham ..................... | 119/707 |
| D423,152 S | * 4/2000 | Kelly ........................... | D30/160 |

\* cited by examiner

*Primary Examiner*—Charles T. Jordan
*Assistant Examiner*—Elizabeth Shaw
(74) *Attorney, Agent, or Firm*—Edwin H. Crabtree; Ramon L. Pizarro; Donald W. Margolis

(57) ABSTRACT

A simulated bird hunting dog-training device used for teaching a dog to run and retrieve. The dog-training device includes a soft, flexible, lightweight, plastic foam cylindrical body. The cylindrical body is dimensioned in length and diameter to be similar in size to the body of a bird being hunted. The body includes a bore therethrough for receiving weighted material therein. Using the weighted material, the weight of the device can be easily adjusted to be similar in weight to a game bird to be hunted. One end of the cylindrical body is attached to a female tube connector. The female tube connecter is used for receiving potting material, such as heated glue, formed into a cylindrical shape. The potting material is used to hold together quill ends of a plurality of bird feathers, which extend outwardly therefrom. The bird feathers add realizium and bird scent to the training device, when teaching the dog. The training device also includes a removable cover, which is received over the cylindrical body. The cover includes a throwing strap used for tossing the training device in the air and for retrieval by the dog.

20 Claims, 1 Drawing Sheet

SIMULATED BIRD HUNTING DOG-TRAINING DEVICE FOR TEACHING A DOG TO RETRIEVE

BACKGROUND OF THE INVENTION (a) Field of the Invention

This invention relates to hunting dog-training devices and more particularly, but not by way of limitation, to a simulated bird hunting dog-training device which simulates a bird shot in flight. The training device, when thrown, is used to teach the dog to run and retrieve.

(b) Discussion of Prior Art

Heretofore, there have been a variety of different types of animal training devices and toys. In U.S. Pat. No. 745,806 to Erb, Jr., a device for training dogs is disclosed. This device includes a dog mouthpiece having a plurality of legs. The legs are used to hold the mouthpiece above a ground surface for ease in gripping. In U.S. Pat. No. 5,706,762 to Dokken, a retrieving training device is shown, which looks like a duck. The training device includes a rope attached to a duck head and threaded through a body. An end of the rope extends outwardly from the rear of the body for use in throwing the training device. In U.S. Pat. No. Des. 423,152 to Kelly, an animal retrieval toy is illustrated.

None of the above mentioned prior art patents specifically disclose the unique features, structure and function of the subject simulated hunting dog-training device for teaching a dog to retrieve.

SUMMARY OF THE INVENTION

In view of the foregoing, it is a primary objective of the subject invention to provide a hunting dog-training device, which when thrown simulates a bird shot in flight. The training device is used to teach a dog to run after and retrieve the device. Also, the training device can be used for the early training puppies.

Another object of the invention is the training device is designed to look like a bird and have a similar weight. The device can come in different sizes and simulate a pheasant, goose, duck, quail and other game birds. Also, the device can include different types of bird feathers. The bird feathers provide bird scent and realism to the training device. For example, if the device is used to teach a dog to retrieve a pheasant, the device would include pheasant feathers.

Yet another object of the invention is the device includes a removable cover with throwing strap. The throwing strap is used for tossing the device in the air and having the dog run and retrieve it.

Still another object of the invention is to provide a soft flexible cylindrical body made of plastic foam for simulating a body of the game bird, when gripped by the dog's teeth.

The simulated bird hunting dog-training device for teaching a dog to retrieve includes a soft, flexible, lightweight, plastic foam cylindrical body. The cylindrical body is dimensioned in length and diameter to be similar in size to the body of a bird being hunted. The body includes a bore therethrough for receiving weighted material therein. Using the weighted material, the weight of the device can be easily adjusted to be similar in weight to a game bird. For example, the overall weight of the training device can be in a range of 3 to 6 pounds for simulating the weight of a pheasant or duck. Obviously, the weight of simulating a goose or a quail would be more or less. One end of the cylindrical body is attached to a female tube connector. The female tube connecter is used for slidably receiving potting material formed into a cylindrical shape and attached to one end of a plurality of bird feathers, which extend outwardly therefrom. The bird feathers add realism and bird scent to the training device, when teaching the dog. The training device also includes a removable cover, which is received over the cylindrical body. The cover includes a throwing strap used for tossing the training device in the air and for retrieval by the dog.

These and other objects of the present invention will become apparent to those familiar with various types of animal training devices when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DETAILED DESCRIPTION OF THE PREFERRED EMBODIMENTS

Figure 1:
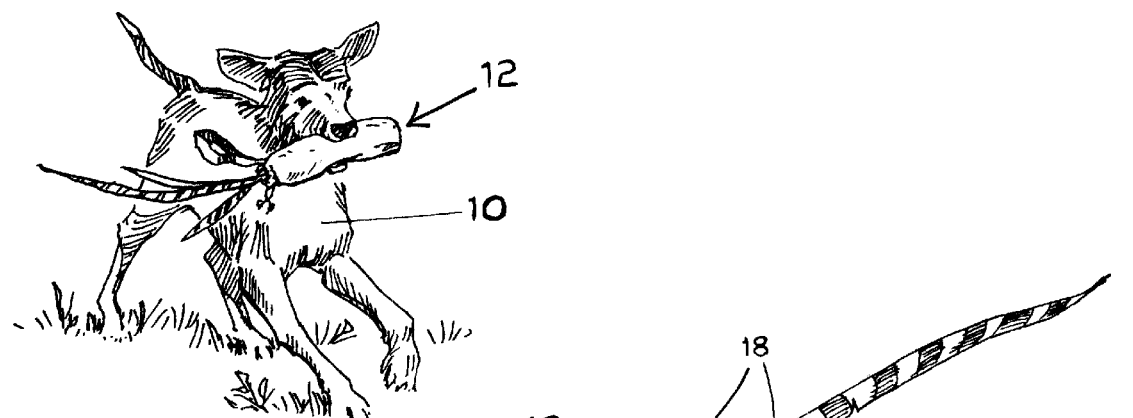
FIG. 1 is a perspective view of a young hunting dog retrieving the subject invention and griping with his or her teeth the cylindrical body with removable cover.

In FIG. 1, a perspective view of a young hunting dog 10 is shown retrieving the subject simulated bird hunting dog-training device. The dog-training device is shown having general reference numeral 12. The dog-training device 12 is shown being gripped by the dog's teeth for retrieval. Broadly, the device 12 includes a soft, flexible, plastic foam cylindrical body 14 received inside a removable cloth cover 16. The removable cover 16 is made of a heavy cloth fabric material and is designed to help protect and extend the life of the cylindrical body 14. The cylindrical body 14 is shown in detail in FIG. 3.

A rear end of the cylindrical body 14 is attached to a plurality of bird feathers 18 extending outwardly therefrom. The bird feathers 18 can be from any type of game bird to add sent and realism to the dog-training device 12. Also, the feathers 18 add aerodynamics to the flight of the device, when it is thrown in the air. In this drawing, the feathers 18 are shown as pheasant feathers.

Figure 2:
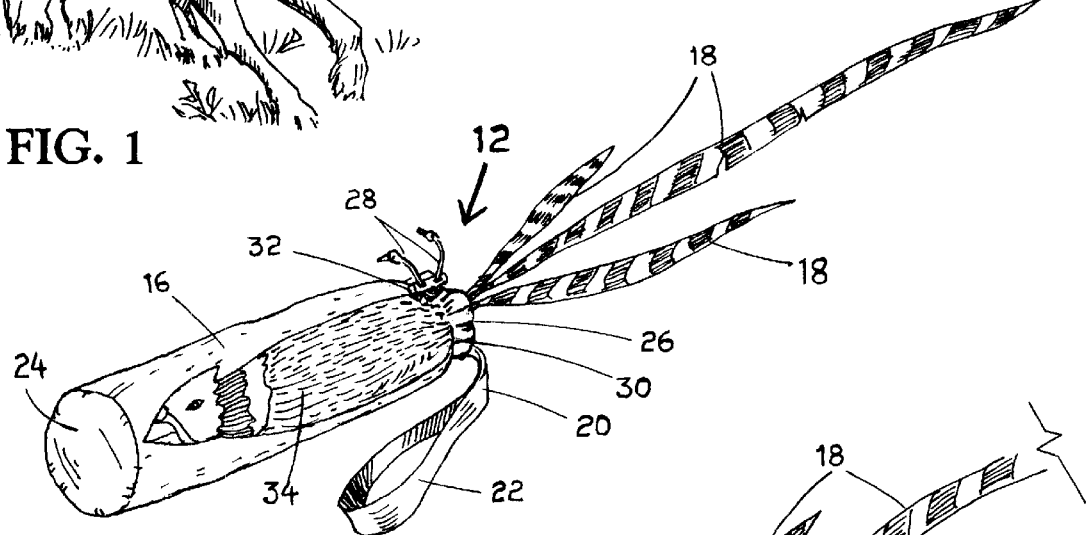
FIG. 2 is a side view of the simulated hunting dog-training device illustrating the removable cover received around the cylindrical body and pheasant feathers extending outwardly from one end of the body. A throwing strap with handle is shown attached to the removable cover.

In FIG. 2, a side view of the simulated bird hunting dog-training device 12 is shown illustrating the removable cover 16 received around the cylindrical body 14 with the bird feathers 18 extending outwardly from a rear end of the body. A throwing strap 20 with a handle 22 is attached next to an open end of the removable cover 16. The handle 22 is used for gripping and throwing the device 12 in the air and having the dog run and retrieve it.

The removable cover 16 includes a closed front end 24 and an open rear end 26. The open rear end 26 is opened and closed using pull strings. 28. The pull strings 28 are received inside a hem 30 disposed around the sides of the open rear end 26. Opposite ends of the pull strings 28 are attached to a barrel lock 32. The barrel lock 32 is used for holding the pull strings 28 in place, when closing the open rear end 26. When the pull strings 28 are loosened on the barrel lock 32 and the open rear end 26 is spread apart, the cover 16 can be removed from around the cylinder body 14 for washing and cleaning. On opposite sides of the cover 16 is an illustration 34 of a body of a game bird. Only one side of the cover 16 is shown in the drawings.

Figure 3:
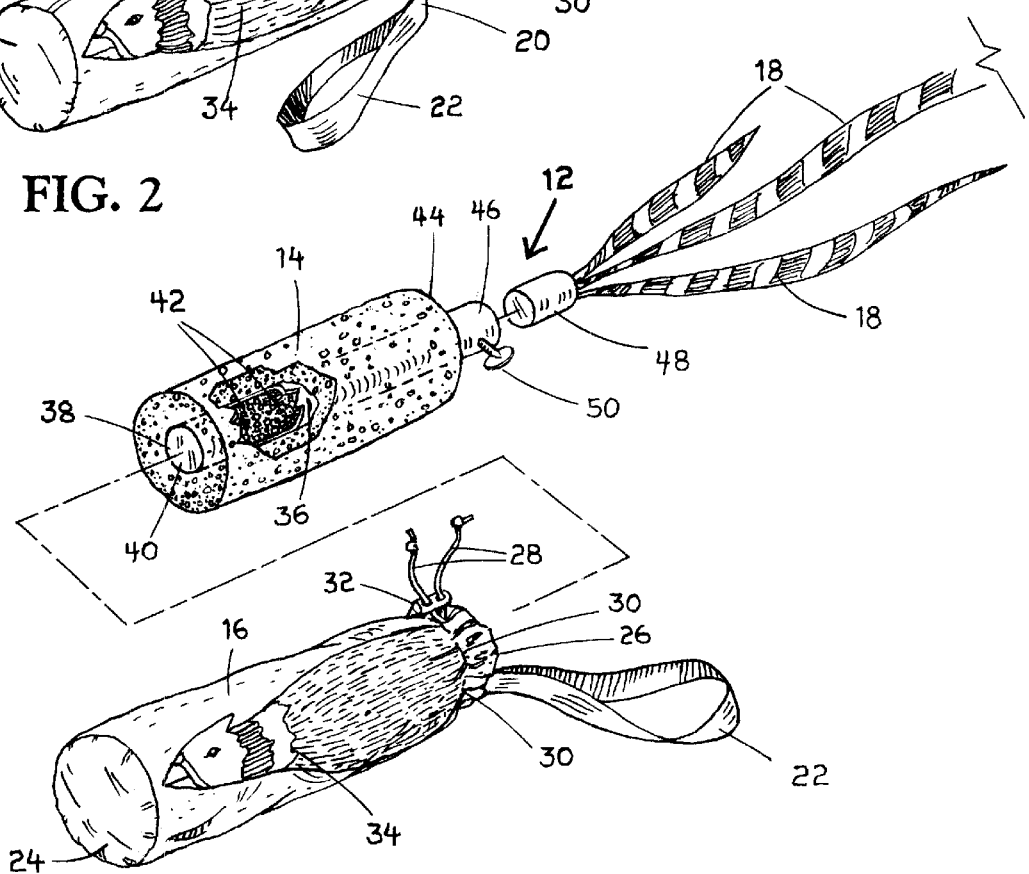
FIG. 3 illustrates a perspective view of the cylindrical body removed from the cover along with a female tube connector attached to one end of the body. Potting material, formed into a cylindrical shape, is shown attached to a quill ends of a plurality of pheasant feathers.

In FIG. 3, a perspective view of the cylindrical body 14 is shown removed from the cover 16. The cylindrical body 14 can have a diameter in a range of 2 to 4 inches and a length in a range from 6 to 18 inches. The diameter and length are adjusted for depicting different sizes of game birds to be hunted. For example, the training device 12 depicting a quail can have a cylindrical body 14 with a diameter of 2 inches and a length of 6 inches. A training device depicting a goose can have a diameter of 4 inches and a length of 18 inches. Also, smaller versions of the training device 12 can be made for the early training of puppies.

The plastic foam cylindrical body 14 provides a soft feel when gripped by the dog's mouth and similar to a feel when gripping a fallen game bird. The cylindrical body 14 also includes a bore 36, shown in dashed lines, through the center and along the length of the body. A first end 38 of the bore 36 at the front or nose of the body 14 includes a plug 40. The plug 40 is used for holding weighted material 42, such as washed pea gravel and the like inside the bore 36. A portion of the body 16 is cutaway to illustrate the weighted material 42 inside the bore 36. The weighted material 42 adds to the overall weight of the training device 12 so that it is similar to the weight of the game bird to be hunted. It should be noted that movement of the weighted material 42 inside the bore 36 and toward the front or nose of the cylindrical body 14 assures that during the flight of the thrown training device 12, the device lands nose first with the feathers 18 training behind.

A second end 44 of the bore 36 is used to slidably receive a female tube connector 46 therein. The female tube connector 46 is used to close off the second end 44 of the bore 36 and to receive potting material 48, such as heated glue, formed into a cylindrical shape. The potting material 48 is used to hold together the quill ends of the feathers 18. The female tube connector 46 includes a thumbscrew 50 in its side. The thumbscrew 50 is used for engaging and securing the potting material 48 inside the connector 46. Obviously, the potting material 48 can be used for holding together quill ends of different types of game bird feathers used with the dog-training device 12.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A simulated bird hunting dog-training device which simulates a bird shot in flight, the device, when thrown, is used to teach a dog to run and retrieve, the dog-training device comprising:

a cylindrical body dimensioned in length and diameter to be similar in size to a body of the bird being hunted;

a plurality of bird feathers, quill ends of said bird feathers attached to one end of said cylindrical body; and a removable cover received over said cylindrical body for adding protection thereto.

2. The dog-training device as described in claim 1 wherein said cylindrical body includes a bore therethrough for receiving weighted material therein.

3. The dog-training device as described in claim 1 wherein said cylindrical body is made of a soft, flexible, plastic foam material.

4. The dog-training device as described in claim 2 further including a female connector, said female connector received in said bore at a rear end of said cylindrical body, said quill ends of said bird feathers attached to said female connector.

5. The dog-training device as described in claim 4 wherein said quill ends are encased in a potting material formed into a cylindrical shape, said potting material slidably received in said female connector.

6. The dog-training device as described in claim 1 wherein said cover includes a throwing strap attached thereto.

7. The dog-training device as described in claim 1 wherein said cover includes a closed end and an open end for inserting said cylindrical body therein.

8. The dog-training device as described in claim 7 wherein the open end of said cover includes a hem around the sides thereof, the hem receiving pull strings therein.

9. The dog-training device as described in claim 8 wherein said pull strings are received through a barrel lock, said barrel lock used for securing the pull strings when closing the open end of said cover around one end of said cylindrical body.

10. A simulated bird hunting dog-training device which simulates a bird shot in flight, the device, when thrown, is used to teach a dog to run and retrieve, the dog-training device comprising:

a cylindrical body dimensioned in length and diameter to be similar in size to a body of the bird being hunted, said cylindrical body made of a soft, flexible, plastic foam material;

a plurality of bird feathers, quill ends of said bird feathers attached to one end of said cylindrical body; and a removable cover having a closed end and an open end, the open end used for receiving said cylindrical body inside said cover.

11. The dog-training device as described in claim 10 wherein said cylindrical body includes a bore through the center thereof and along the length of said body, said bore used for receiving weighted material therein.

12. The dog-training device as described in claim 11 further including a female connector, said female connector received in one end of said bore in said cylindrical body, said quill ends of said bird feathers attached to said female connector.

13. The dog-training device as described in claim 12 wherein said quill ends are encased in a potting material formed into a cylindrical shape, said potting material slidably received in said female connector.

14. The dog-training device as described in claim 10 wherein said cover includes a throwing strap attached thereto.

15. The dog-training device as described in claim 11 wherein said cover includes at least one bird illustration along a side thereof.

16. A simulated bird hunting dog-training device which simulates a bird shot in flight, the device, when thrown, is used to teach a dog to run and retrieve, the dog-training device comprising:

a cylindrical body dimensioned in length and diameter to be similar in size to a body of the bird being hunted, said cylindrical body made of a soft, flexible, plastic foam material;

a plurality of bird feathers, quill ends of said bird feathers attached to one end of said cylindrical body; and a removable cover having a closed end and an open end, the open end used for receiving said cylindrical body inside said cover, said removable cover having at least one bird illustration along a side thereof.

17. The dog-training device as described in claim 16 wherein said cylindrical body includes a bore through the center thereof and along the length of said body, said bore used for receiving weighted material therein, said bore having a plug in one end thereof.

18. The dog-training device as described in claim 16 further including a female connector with a threaded fastener in a side thereof, said female connector received in an opposite end of said bore in said cylindrical body, said quill ends of said bird feathers attached to said female connector using said threaded fastener.

19. The dog-training device as described in claim 18 wherein said quill ends are encased in a potting material formed into a cylindrical shape, said potting material slidably received in said female connector and secured therein using said threaded fastener.

20. The dog-training device as described in claim 16 wherein said cover includes a throwing strap with handle, one end of said throwing strap attached to said cover.

\* \* \* \* \*